United States Patent
Lee

(10) Patent No.: US 7,982,803 B2
(45) Date of Patent: Jul. 19, 2011

(54) AUDIO AND VIDEO SYNCHRONIZING APPARATUS AND METHOD

(75) Inventor: Jong Wook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1190 days.

(21) Appl. No.: 11/401,798

(22) Filed: Apr. 10, 2006

(65) Prior Publication Data
US 2006/0236359 A1  Oct. 19, 2006

(30) Foreign Application Priority Data

Apr. 15, 2005  (KR) .................. 10-2005-0031350

(51) Int. Cl.
*H04N 7/54* (2006.01)
*H04N 5/06* (2006.01)

(52) U.S. Cl. ..... 348/515; 348/512; 348/518; 348/423.1; 348/425.4

(58) Field of Classification Search .......... 348/512, 348/515, 518, 705, 423.1, 423.4
See application file for complete search history.

(56) References Cited

U.S. PATENT DOCUMENTS

| 6,262,776 | B1* | 7/2001 | Griffits | 348/512 |
| 7,020,894 | B1* | 3/2006 | Godwin et al. | 725/135 |
| 7,054,544 | B1* | 5/2006 | Tanaka | 386/96 |
| 7,570,304 | B1* | 8/2009 | Trinh et al. | 348/512 |
| 2005/0147129 | A1* | 7/2005 | Maehara et al. | 370/486 |

FOREIGN PATENT DOCUMENTS
KR   10-2006-0090099   9/2006
* cited by examiner

*Primary Examiner* — Jefferey Harold
*Assistant Examiner* — Jean W Désir
(74) *Attorney, Agent, or Firm* — Lee, Hong, Degerman, Kang & Waimey

(57) ABSTRACT

Provided is an audio video synchronizing apparatus and method in a video processing equipment. It is detected whether or not an external device connected to an audio/video output port of the video processing equipment is an audio system, and an audio signal synchronized with a video signal outputted to a display device of the video processing equipment is provided to the audio system through an audio output port when the detection result shows that the external device is the audio system. Accordingly, a vide signal on a screen is synchronized with an audio signal outputted from the audio system.

18 Claims, 4 Drawing Sheets

ND VIDEO SYNCHRONIZING
APPARATUS AND METHOD

Pursuant to 35 U.S.C. §119(a), this application claims the benefit of earlier filing date and right of priority to Korean Application No. 10-2005-0031350, filed on Apr. 15, 2005, the contents of which is hereby incorporated by reference herein in its entirety.

BACKGROUND OF THE INVENTION

1. Field of the Invention

The present invention relates to an audio and video synchronizing apparatus and method capable of synchronizing an audio signal outputted from a digital video signal processing apparatus to an external device with a video signal outputted to a display device of the apparatus.

2. Description of the Related Art

A representative digital video processing equipment is a digital TV. The digital TV may be used in connection with peripheral devices such as a DVD, a game player, a VCR, an audio receiver and the like. The digital TV is provided with external device connection ports for the connection with a peripheral device. The digital TV receives and processes audio and/or video signals transmitted from a connected external device, or outputs audio and/or video signals processed by the digital TV to the external device.

FIG. 1 illustrates the configuration of a TV body 10 connected to a VCR 13, an external device, through an audio cable 11 and a video cable 12 of right/left channels. In such a connection state, audio and video signals outputted from the TV 10 may be outputted to the VCR 13 through the cables 11 and 12. Accordingly, the VCR 13 may record the audio and video signals of the TV.

The digital TV provides a high-definition image with superior quality sound. One exemplary method to provide a user with the noticeably high definition image and supreme quality sound is providing an image processing equipment equipped with a signal processor and an output unit, both can satisfy image quality and sound quality. The implementation of the high-definition image is affected by a display device but is not a big issue because most digital TVs are employing display devices allowing the implementation thereof. However, processing an audio signal only with the image processing equipment such as a digital TV has many limitations. For this reason, an audio processing system such as an audio receiver is separately used in many cases. For example, a video signal is viewed using a display device employed by a digital TV, and an audio signal is caught through an audio system connected to the digital TV.

When a user uses an audio system by connecting it to a digital TV, audio/video output ports, so called monitor output ports, provided to the digital TV are used in most cases.

FIG. 2 is a configuration view illustrating that an audio device is connected to a digital TV as an external device. In FIG. 2, an audio output port of monitor output ports of a TV body 30 is connected to an audio input port of an audio device 32 using audio cables 31 of right/left channels. An audio output signal of the right/left channels of the audio device 32 is outputted to each speaker 33. Accordingly, the TV 30 outputs an audio signal to the audio device 32 through the audio cables 31, and the audio device 32, an audio processing system, performs audio signal processing including equalizing, sound field processing, sound effect processing and the like, and thus outputs high quality sound to the speaker 33. In such manner, it becomes possible to provide a user with the high-definition image of the digital TV and the supreme quality sound using the audio device connected as an external device.

However, outputs of the audio and video may not coincide with each other because the time difference exists between an audio signal provided to the audio device through the audio output port of the digital TV and a video signal outputted to the display device. This because it takes relatively long time for the digital TV to process the digital video signal as compared to the time it takes to process the audio signal. Specifically, because the digital video signal contains a larger amount of data than the audio signal and is transmitted with its large amount of data compressed, it takes relatively long time for the digital TV to decode the video signal.

For this reason, in a system where an audio signal is outputted to an external audio device using a monitor output port of a digital TV and a video signal is outputted to a display device of the digital TV, the audio and video are not synchronized because of the time difference between the video output and the audio output of the external audio device.

In order to solve the problem that the outputted audio and video signals are not synchronized, a technology of providing an audio delay function in an audio device has been proposed to delay input audio signal processing for a certain period of time so that the audio signal can be synchronized with the video signal outputted to a display device of a digital TV. However, this method is also problematic in that it is difficult to set an exact period of time during which the audio processing is delayed for the synchronization with the video. This is because the difference in time between video signal processing and audio signal processing is varied depending on digital TVs, a period of time for delay is also varied depending on audio devices, and the time difference of the output exists between the digital TVs and the audio devices.

SUMMARY OF THE INVENTION

Accordingly, the present invention is directed to an audio and video synchronizing apparatus and method that substantially obviate one or more problems due to limitations and disadvantages of the related art.

An object of the present invention is to provide an audio video synchronizing apparatus and method capable of synchronizing an audio signal outputted to an external device from a digital video signal processing apparatus with a video signal outputted to a display device of the image processing equipment.

Another object of the present invention is to provide an audio and video synchronizing apparatus and method capable of synchronizing an audio signal outputted to an audio device connected to a digital TV with a video signal outputted to a display device of the digital TV.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an audio video synchronizing apparatus and method in which it is automatically determined whether or not an audio signal is outputted to an external device in a digital video signal processing apparatus, and outputting an audio signal synchronized with a video signal outputted to a display device of the processing apparatus when it is determined that the audio signal is outputted to the external device.

In a further another aspect of the present invention, there is provided an audio video synchronizing apparatus and method in which it is automatically detected whether an external device is connected to a digital TV, and it is determined whether the connected external device is an audio device. When it is determined that the external device connected to the digital TV is an audio device, an audio signal synchronized with a video signal outputted to a display device of the digital TV is selected, and the audio signal is outputted to the external audio device, thereby performing the synchronization of the video and audio signals.

In a still further another aspect of the present invention, there is provided an audio video synchronizing apparatus and method in which it is automatically detected whether or not an external device is connected to an monitor output port of a digital TV, and it is determined whether the external device is an audio device according to whether the external device is connected to a video output port of the monitor output port. When it is determined that the external device connected to the digital TV is an audio device, a speaker output audio signal synchronized with a video signal outputted to a display device of the digital TV is selected and is outputted to the external audio device, thereby synchronizing the audio and video signals.

In a still further another aspect of the present invention, there is provided an audio video synchronizing apparatus and method in which when an audio system is connected as an external device to a digital video signal processing apparatus such as a DTV, an audio signal outputted to an external audio device is automatically synchronized with a video signal outputted to the display device of the video processing equipment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
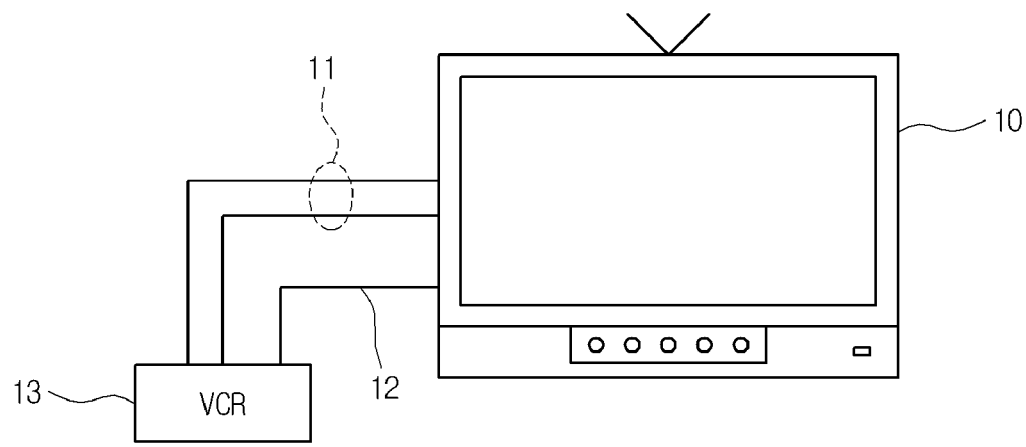
FIG. 1 is a view illustrating the configuration of a TV connected to a VCR, an external device.
Figure 2:
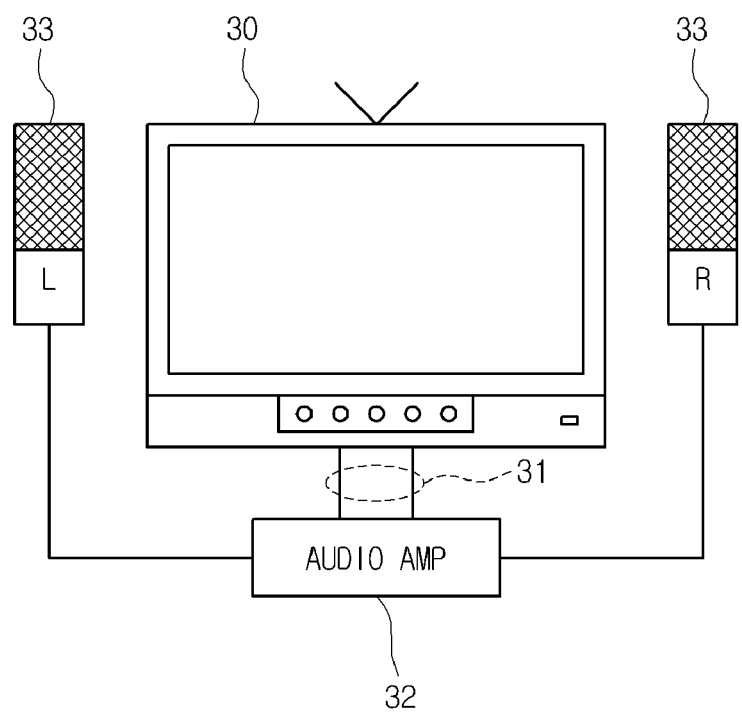
FIG. 2 is a view illustrating the configuration of a TV connected to an audio device, an external device.
Figure 3:
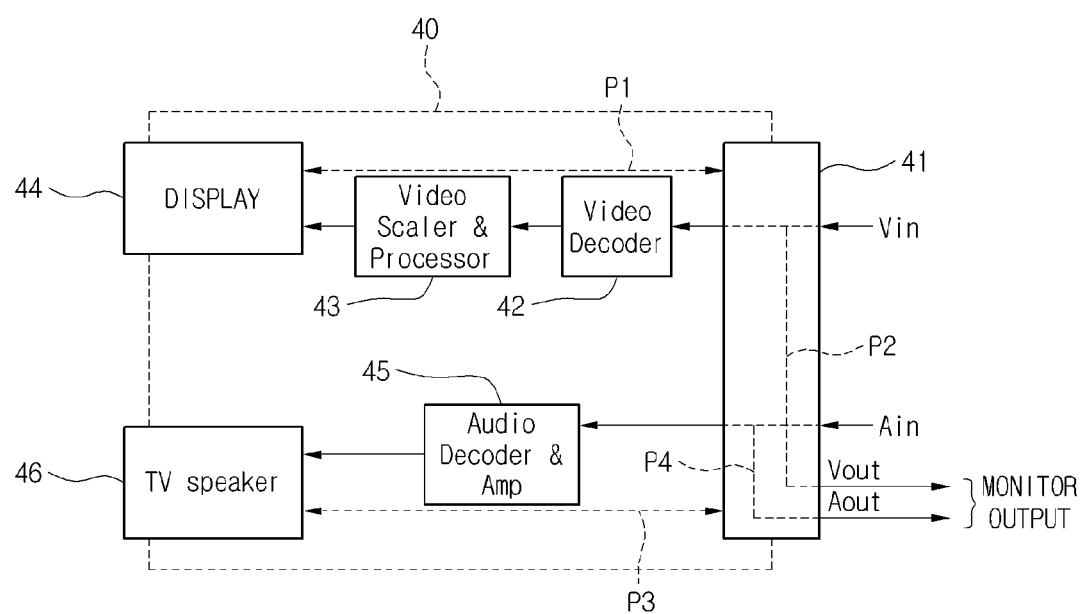
FIG. 3 is a view illustrating an audio and video processing unit in a digital TV.

FIG. 3 illustrates the configuration of an audio and video signal processing unit 40 of a digital TV, a video processing equipment employing the present invention. Referring to FIG. 3, the digital TV includes an AV switch 41 switching inputted a video signal (Vin) and an audio signal (Ain), a video decoder 42 decoding the video signal inputted through the AV switch 41, a video scaler/processor 43 scaling the decoded video signal, converting a formant of the signal and then outputting the signal, a display 44 displaying the video signal outputted from the video scaler/processor 43, an audio decoder/amplifier 45 decoding and amplifying the audio signal inputted through the AV switch 41, and a TV speaker 46 outputting the decoded and amplified audio signal.

The AV switch 41 controls processing paths of the audio signal and the video signal. The video signal (Vin) and the audio signal (Ain) inputted to the AV switch 41 are received broadcasting signals, audio and video signals inputted from an external device, or audio and video signals stored in e.g., a storage and reproduced.

The video signal (Vin) inputted to the AV switch 41 is decoded through the video decoder 42. The video signal decoded by the video decoder 42 is converted into a proper video format by the video scaler/processor 43 and then outputted therefrom. The video signal outputted from the video scaler/processor 43 is inputted to and displayed on the display 44. Here, the display 44 may be a display device such as a cathode ray tube (CRT), a liquid crystal display device (LCD) and a plasma display panel (PDP), and a projection type display device.

The audio signal (Ain) inputted to the AV switch 41 is decoded by the audio decoder/amplifier 45, passes through the proper signal amplifying, and then is outputted. The audio signal outputted from the audio decoder/amplifier 45 is outputted through a TV speaker 46.

The AV switch 41 controls output paths of the audio signal and the video signal. For example, an audio signal (Ain) and a video signal (Vin) inputted to the AV switch 41 are transmitted to a monitor output port. In the drawing, the paths are illustrated through which the inputted video signal (Vin) and audio signal (Ain) are outputted to the monitor output ports, respectively (Vout, Aout).

In FIG. 3, a processing path (P1) for a video signal (Vin) inputted to the AV switch 41 and an audio signal processing path (P3) are illustrated. Here, time it takes to process data of the video signal is longer than time it takes to process data of the audio signal. This because as mentioned above, the amount of video data processed is greater than the amount of audio data processed. Therefore, the audio signal is synchronized with the video signal by delaying output of the audio decoder/amplifier 45 processing the audio signal (Ain) in consideration of time it takes for the video decoder, which processes the video signal (Vin) inputted to the AV switch 41, and the video scaler/processor 43 to process the video data. In such manner, an audio signal and a video signal outputted to a display device and a speaker of a digital TV system can be synchronized.

Referring to FIG. 3, the video and audio signal processing paths for the synchronization between the video signal and the audio signal, and the relation therebetween will now be described in more detail.

A first video path (P1) exists that outputs a video signal from the AV switch 41 to the display 44 of the video processing equipment. A second video path (P2) exists that bypasses a video signal to the monitor output port. A first audio path (P3) exists that outputs an audio signal from the AV switch 41 to the TV speaker 46. Finally, a second audio path (P4) exists that bypasses an audio signal from the AV switch 41 to the monitor output port.

As for a video signal (Vin) inputted to the AV switch 41, the time it takes for the signal to be outputted to the display 44 through the first video path (P1) is longer than the time it takes for the signal to be outputted to the monitor output port through the second video path (P2). Therefore, the difference in video processing time between the TV screen output and the monitor output port occurs. Namely, the time delay necessarily occurs in outputting the inputted video signal (Vin) on a TV screen because a predetermined time is required to process video data through the video decoder 42 and the video scaler/amplifier 43. However, because the monitor output port (Vout) diverges directly from the AV switch 41 and bypasses the signal, such time delay does not occur. For this reason, the time difference therebetween occurs.

As for an audio signal (Ain) inputted to the AV switch 41, the time difference does not occur between an audio signal outputted to the TV speaker 46 through the first audio path (P3) and a video signal outputted to the display 44 through the first video path (P1). This is because even though the difference in time between the video signal processing and the audio signal processing occurs, this difference is compensated through the internal synchronization processing of a system. Namely, because the data amounts of the video signal and the audio signal are different, the audio signal processing is intentionally delayed in consideration of the fact that the time it takes to process the video signal is longer than the time it takes to process the audio signal. Accordingly, the output of the audio signal is synchronized with the output of the video signal. Here, the controlling of the delay of the audio signal processing is performed by an input port of the TV speaker 46 or by the audio decoder/amplifier 45.

Because the second video path (P2) and the second audio path (P4) bypass video and audio signals to the monitor output ports, respectively, the time difference therebetween does not occur. Namely, because the inputted audio signal (Ain) and the video signal (Vin) are directly outputted to the monitor output port from the AV switch 41, both the signals are outputted in a synchronized state.

According to a device operation command of a user and a control unit (not shown), the AV switch 41 controls the audio and video signal processing paths, thereby allowing the audio and video output using the speaker 46 and the display 44 of the video processing equipment, or allowing the audio and video output to an external device connected to an output port.

However, as for the monitor output path and the output path according to the internal signal processing, the video signal of the second video path (P2) is synchronized with the audio signal of the second audio path (P4), but the video sigal of the first video path (P1) is not synchronized with the audio signal of the second audio path (P4).

That is, the video signal displayed on a TV screen is not synchronized with the audio signal of the second audio path (P4). Likewise, the audio signal outputted to the TV speaker 46 is not synchronized with the audio signal of the second audio path (P4).

Such a phenomenon may not be a big issue when an audio/video device is connected to the monitor output port as an external device. However, when a user connects an audio system to the monitor output port to listen to a sound and views an image from the TV screen, the synchronization between the two is not achieved. Accordingly, the user may have to put up with inconvenience of uncoincident lip-sync when viewing an image through a digital TV while listening to a sound through an audio device by connecting the audio device to the TV.

The audio and video synchronizing system according to an embodiment of the present invention is directed to synchronizing an audio signal with a video signal when a user views an image through a TV screen of a digital TV while listening to a sound using an audio system, an external device connected to a monitor output port.

Figure 4:
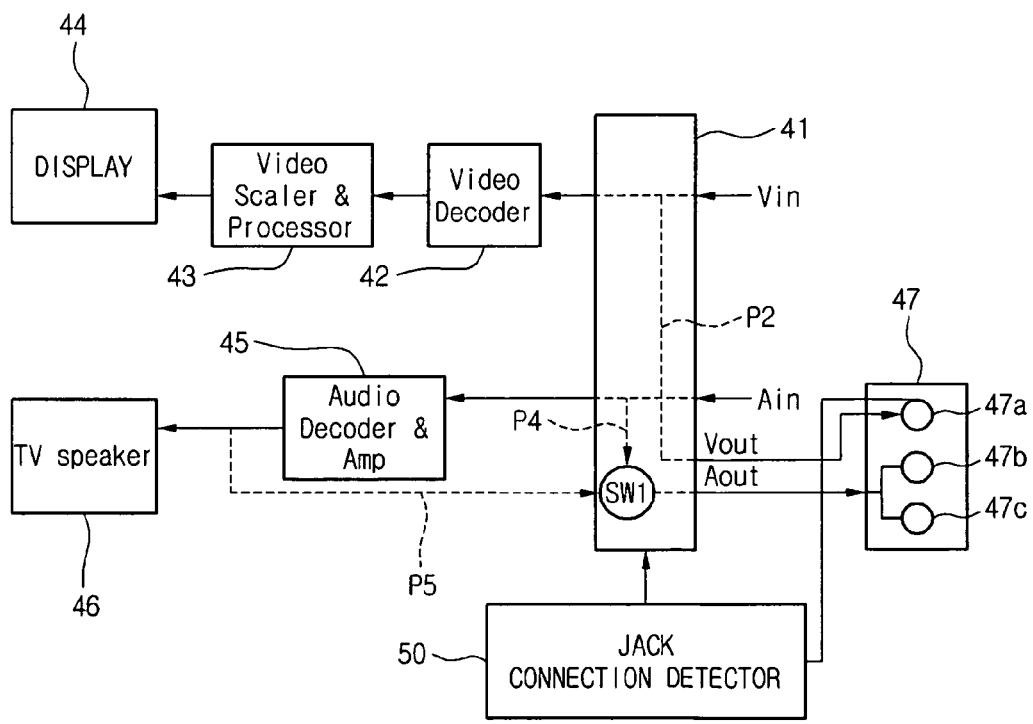
FIG. 4 is a view illustrating an audio and video processing unit of a digital TV according to an embodiment of the present invention.

FIG. 4 illustrates the configuration of an audio and video processing circuit of a digital TV according to an embodiment of the present invention. In the embodiment in FIG. 4, a third audio path (P5) is configured. The third audio path (P5) is a path from an output port of the audio decoder/amplifier 45 or an input port of the TV speaker 46 to an audio output port (Aout) of the AV switch 41. The third audio path (P5) and the second audio path (P4) are selectively connected to the audio output port (Aout). In order to selectively connect the third audio path (P4) and the second audio path (P4) to the audio output port (Aout), a selection switch (SW1) is provided. Even though the selection switch (SW1) is included in the AV switch 41 in the drawing, the two switches SW1 and 41 may be separately configured.

An audio signal output port (Aout) selected by the selection switch (SW1) and a video signal output port (Vout) connected to the second video path (P2) are connected to a monitor output port 47. The monitor output port 47 is an output port connecting an external audio/vide device or an audio device with a digital TV. The monitor output port 47 includes a video port 47a and audio ports. The audio ports include a first channel audio port 47b and a second channel audio port 47c. The first channel audio port is an audio output port of a left channel (L) of a stereo audio system, and the second channel audio port is an audio output port of a right channel (R). In this regard, audio signal output lines of the second audio path (P4) and the third audio path (P5) are in pair, respectively corresponding to the first channel audio port and the second channel audio port.

In an embodiment of the present invention in FIG. 4, the selection switch (SW1) may be switched manually but may be automatically switched according to the result of detecting whether or not an external device connected to the monitor connection port is an audio system (i.e., audio device) In order to detect whether or not the external device is an audio device, a jack connection detector 50 is provided. The jack connection detector 50 controls the selection switch (SW1). As another embodiment of controlling the selection switch (SW1), a controller (not shown), e.g., a microprocessor included in a digital TV, may control the selection switch (SW1) according to the detection result of the jack connection detector 50. Also, a user may select an external output for an audio signal using a user interface such as a remote controller, so that a controller controls the selection switch (SW1) and connects the third audio path (P5) to the monitor output port 47.

In an embodiment of the present invention, the jack connection detector 50 is connected to the video port 47a of the monitor output port 47. The jack connection detector 50 detects a low (or high) signal according to whether an external device is connected to the audio and video ports 47a, 47b and 47c through an A/V cable. Because such a method is based upon the well-known external input automatic detecting circuit for a TV, the method will be implemented by using the known technology.

In an embodiment of the present invention, the jack connection detector 50 is connected only to the video port 47a to detect only the connection of a video jack. If an external device is connected to the video port 47a by an AV cable, it can be determined that the external device connected to the monitor output port 47 is an audio/video device. If the external device is not connected to the video port 47a by the AV cable, it can be determined that the external device connected to the monitor output port 47 is an audio device. The external device of the former case may be e.g., an external AV storing device including a VCR, and the external device of the later case one may be e.g., an audio receiver.

In another example, the jack connection detector 50 detects connection with respect to all the video port 47a and the audio ports 47b and 47c. In this case, if the detection result shows that the external device is connected to all the audio and video ports 47a, 47b and 47c, the external device can be determined to be an audio/video device. If the external device is connected only to the audio ports 47b and 47c and not connected to the video port 47a, then the external device can be determined to be just an audio device (audio system).

According to the external device detection result of the jack connection detector 50, the selection switch (SW1) is controlled. If just an audio device is connected as an external device, the selection switch (SW1) selects the third audio path (P5) by the jack connection detector 50. Accordingly, an audio signal synchronized in the video processing equipment itself is outputted to the audio output port (Aout), and this audio signal is transmitted to the audio output ports 47b and 47c of the monitor output port 47. Therefore, the audio signal synchronized with a video signal outputted to the display 44 is outputted to the audio device connected to the monitor output port 47.

As described above, the selection switch (SW1) selects the third audio path (P5) and transmits an audio signal to the monitor output port 47, so that a video signal outputted to the display 44 of the video processing equipment, an audio signal outputted to the TV speaker 46, and an audio signal outputted to the external audio device connected to the monitor output port 47 are synchronized and then outputted.

If an audio/video device is connected as an external device, the selection switch (SW1) selects the second audio path (P4) according to the jack connection detector 50. Accordingly, signals bypassed from the AV switch 41 to the audio output port (Aout) and the video output port (Vout) are outputted to the audio output ports 47b and 47c and the video output port 47a of the monitor output port 47. Therefore, the external audio/video device connected to the monitor output port 47 receives synchronized audio and video signals.

Figure 5:
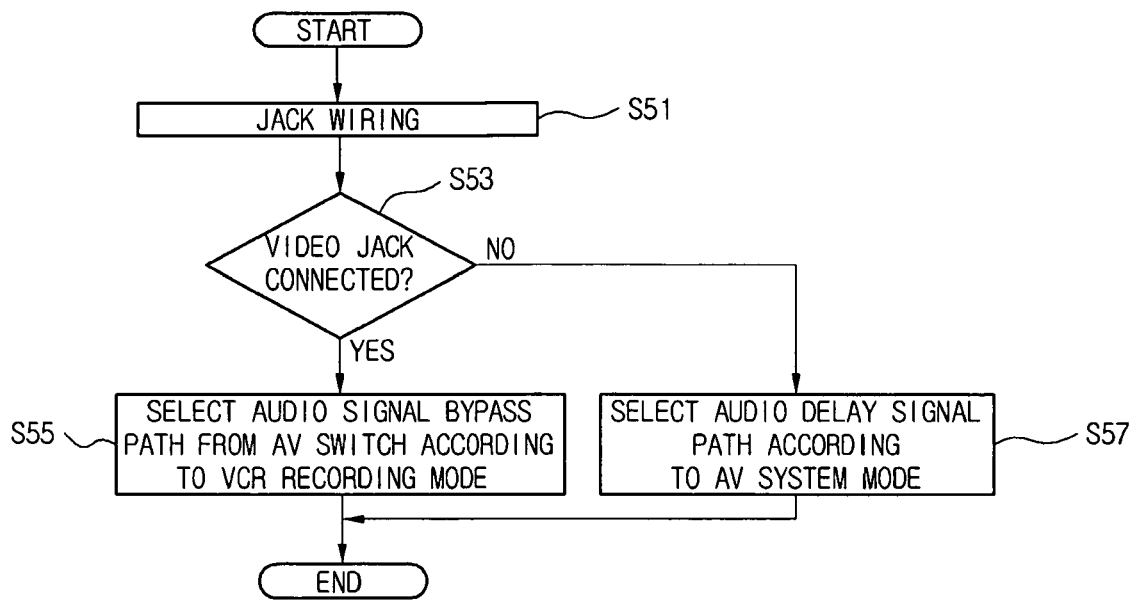
FIG. 5 is a flow chart of an audio and video synchronizing method according to an embodiment of the present invention.

FIG. 5 is a flow chart of an audio and video synchronizing method according to an embodiment of the present invention. First, jack wiring with respect to the monitor output port 47 is performed (S51). The jack connection detector 50 detects whether or not a video jack is connected (S53). If the video jack is connected to the monitor output port 47, the operation S55 is performed, and if not, the operation S57 is performed. The operation S55 is a control process performed when it is determined that an audio/video jack, i.e., an audio/video device, is connected to the monitor output port 47 as an external device. The operation S57 is a control process performed when it is determined that an audio device is connected to the monitor output port 47. In the operation S55, an external device, e.g., a VCR, is connected to the monitor output port 47. In this case, the VCR is considered to be in a recording mode, and the selection switch (SW1) is controlled to select the second audio path (P4). Accordingly, audio and video signals (Ain and Vin) inputted to the AV switch 41 are bypassed and transmitted to the monitor output port 47. In the operation S57 performed when it is determined that an audio device is connected to the monitor output port 47, the selection switch (SW1) is controlled to select the third audio path (P5). Accordingly, an audio signal of the third audio path (P5) is sent to the audio device through the audio output ports 47b and 47c of the monitor output port 47. Accordingly, in this case, the audio signal outputted to the external audio device is synchronized with the vide signal outputted to the TV display 44.

So far, the embodiment has been described in which when determining that an external device is an audio device, the jack connection detector 50 selects an audio signal synchronized with a video signal outputted to a display device of a video processing equipment and outputs the synchronized audio signal to the external audio device. However, as another embodiment of the present invention, a method may be used in which a user selects an audio and/or vide output mode using a user interface such as a remote controller of a video processing equipment and according to the user's selection, a proper audio and/or video signal is selected and then outputted. For example, 'an external audio device output mode' in which only an audio signal is outputted to an external device is set as an output mode of a video processing equipment. Then, when a user selects 'the external audio device output mode' as an output mode of the video processing equipment, a controller of the video processing equipment controls the selection switch (SW1) to connect the third audio path (P5) to the output port 47. Then, an audio signal synchronized with a video signal outputted to a display device of the video processing equipment is outputted to the audio ports 47b and 47c of the output port 47. Namely, unlike the former embodiment in which an output path is automatically controlled for the synchronization of an audio signal according to the result of detecting the kinds of external devices, in the later embodiment, a user directly designates an output path to an external audio device for the synchronization of the audio signal.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An audio and video synchronizing apparatus comprising:
    a video signal processing unit processing a video signal that is provided to a display device of video processing equipment;
    an audio signal processing unit processing an audio signal that is provided to an audio device of the video processing equipment, the audio signal synchronized with the video signal;
    a switching unit selecting paths for the video signal that is input to the video signal processing unit and the audio signal that is input to the audio signal processing unit, and selecting at least an audio signal for output to an external device that is not part of the video processing equipment;
    an outputting unit outputting the selected at least an audio signal to the external device; and
    an output selecting unit controlling the switching unit according to a kind of the external device,
    wherein the switching unit is controlled to select a first audio signal that bypasses the audio signal that is input to the audio signal processing unit as the at least an audio signal for output to the external device or to select a second audio signal output from the audio signal processing unit as the at least an audio signal for output to the outputting unit.

2. The apparatus according to claim 1, further comprising a detector detecting the kind of the external device connected to the outputting unit.

3. The apparatus according to claim 1, wherein the kind of the external device connected to the outputting unit is either an audio/video device or an audio device.

4. The apparatus according to claim 3, wherein the switching unit is controlled to select the second audio signal when it is determined that the external device connected to the outputting unit is the audio device.

5. The apparatus according to claim 1, wherein the kind of the external device connected to the outputting unit is determined according to whether the external device is connected to a video output port or an audio output port.

6. An audio and video synchronizing apparatus comprising:
a video signal processing unit processing a video signal that is provided to a display device of video processing equipment;
an audio signal processing unit processing an audio signal that is provided to an audio device of the video processing equipment, the audio signal synchronized with the video signal; and
an output selecting unit selecting an audio signal that is output to an external device that is not part of the video processing equipment,
wherein the output selecting unit selects a first audio signal that bypasses the audio signal that is input to the audio signal processing unit as the audio signal that is output to the external device or selects a second audio signal output from the audio signal processing unit as the audio signal that is output to the external device.

7. An audio and video synchronizing apparatus comprising:
a video signal processing unit processing a video signal that is provided to a display device of video processing equipment;
an audio signal processing unit outputting an audio signal that is synchronized with the video signal; and
an audio output selecting unit selecting an audio signal that is output to an external device that is not part of the video processing equipment,
wherein the audio output selecting unit selects an audio signal that bypasses the audio signal that is input to the audio signal processing unit or selects an audio signal output from the audio signal processing unit that is synchronized with the video signal as the audio signal that is output to the external device.

8. An audio and video synchronizing apparatus comprising:
a video signal processing unit processing a video signal that is provided to a display device of video processing equipment;
an audio signal processing unit processing an audio signal that is provided to an audio device of the video processing equipment, the audio signal synchronized with the video signal;
an outputting unit outputting at least an audio signal to an external device that is not part of the video processing equipment; and
an output selecting unit controlling the outputting unit according to a kind of the external device,
wherein the output selecting unit controls the outputting unit to select a first audio signal that bypasses the audio signal that is input to the audio signal processing unit as the at lease an audio signal output to the external device or to select a second audio signal output from the audio signal processing unit as the at least an audio signal output to the external device.

9. An audio and video synchronizing apparatus comprising:
a video signal processing unit processing a video signal that is provided to a display device of video processing equipment;
an audio signal processing unit processing an audio signal that is provided to an audio device of the video processing equipment, the audio signal synchronized with the video signal;
an outputting unit outputting at least an audio signal to an external device that is not part of the video processing equipment;
a detecting unit detecting a kind of the external device; and
an output selecting unit controlling the outputting unit according to the detected kind of the external device,
wherein the output selecting unit controls the outputting unit to select a first audio signal that bypasses the audio signal that is input to the audio signal processing unit as the at least an audio signal output to the external device or to select a second audio signal output from the audio signal processing unit as the at least an audio signal output to the external device.

10. A method of controlling audio and video output comprising:
determining a kind of an external device that is not part of the video processing equipment and is connected to an output port of video processing equipment; and
selecting an audio signal according to a result of the determination and outputting the selected audio signal to the external device,
wherein the selected audio signal is either a first audio signal that bypasses an audio signal that is input to an audio signal processing unit that synchronizes the audio signal with a video signal that is provided to a display device of the video processing equipment or a second audio signal output from the audio signal processing unit.

11. The method according to claim 10, determining the kind of the external device comprises determining whether the external device connected to the output port is an audio device.

12. The method according to claim 10, wherein the second audio signal is an audio signal that is provided to a speaker of the video processing equipment and synchronized with the video signal.

13. The method according to claim 10, wherein selecting the audio signal and outputting the selected audio signal to the external device is performed automatically according to a result of the determination.

14. The method according to claim 10, wherein selecting the audio signal and outputting the selected audio signal to the external device is performed according to a user's output mode setting.

15. The method according to claim 10, wherein the audio signal that is synchronized with the video signal is delayed according to a video signal processing path.

16. A method of controlling audio and video output comprising:
selecting an output mode of video processing equipment; and
selecting an audio signal according to the selected output mode for output to an external audio device that is not part of the video processing equipment; and
outputting the selected audio signal to the external audio device,
wherein the selected audio signal is either a first audio signal that bypasses an audio signal that is input to an audio device of the video processing equipment that synchronizes the audio signal with a video signal that is provided to a display device of the video processing equipment or a second audio signal output from the audio device.

17. The method according to claim 16, further wherein the second audio signal is an audio signal that is provided to a speaker of the video processing equipment and synchronized with the video signal.

18. The method according to claim 16, wherein the audio signal that is synchronized with the video signal is delayed according to a video signal processing path.

* * * * *